(12) United States Patent
Skerry et al.

(10) Patent No.: US 9,350,632 B2
(45) Date of Patent: May 24, 2016

(54) DETECTION AND HANDLING OF VIRTUAL NETWORK APPLIANCE FAILURES

(71) Applicant: Intel Corporation, Santa Clara, CA (US)

(72) Inventors: Brian Skerry, Gilbert, AZ (US); Adrian Hoban, Castlebar (IE)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 14/034,019

(22) Filed: Sep. 23, 2013

(65) Prior Publication Data

US 2015/0089331 A1  Mar. 26, 2015

(51) Int. Cl.
| | |
|---|---|
| *H04L 1/18* | (2006.01) |
| *H04L 12/26* | (2006.01) |
| *G06F 9/455* | (2006.01) |

(52) U.S. Cl.
CPC ........ *H04L 43/0823* (2013.01); *G06F 9/45533* (2013.01); *G06F 9/45558* (2013.01); *H04L 12/26* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,996,748 B2 * | 2/2006 | Uhlig et al. | 714/38.13 |
| 8,032,660 B2 * | 10/2011 | Sahita et al. | 709/250 |
| 8,130,641 B2 * | 3/2012 | Wong et al. | 370/229 |
| 8,276,208 B2 * | 9/2012 | Morgan | 726/27 |
| 2010/0083250 A1 * | 4/2010 | Nakai | 718/1 |
| 2010/0165876 A1 * | 7/2010 | Shukla et al. | 370/254 |
| 2010/0232290 A1 * | 9/2010 | Wong et al. | 370/229 |
| 2011/0004877 A1 | 1/2011 | Wu | |
| 2012/0102135 A1 * | 4/2012 | Srinivasan et al. | 709/213 |
| 2012/0311120 A1 * | 12/2012 | Yasuda et al. | 709/223 |
| 2013/0055206 A1 * | 2/2013 | Dudek et al. | 717/124 |
| 2013/0114610 A1 * | 5/2013 | Polcyn et al. | 370/400 |
| 2014/0059379 A1 * | 2/2014 | Ren et al. | 714/15 |
| 2015/0020069 A1 * | 1/2015 | Patani et al. | 718/1 |

FOREIGN PATENT DOCUMENTS

| | | |
|---|---|---|
| JP | 2011-060055 A | 3/2011 |
| WO | 2011/043317 A1 | 4/2011 |

OTHER PUBLICATIONS

Office Action received for Japanese Patent Application No. 2014-171308, mailed on Aug. 18, 2015, 2 pages of English Translation and 2 pages of Japanese Office Acton.

\* cited by examiner

*Primary Examiner* — Daniel McMahon
(74) *Attorney, Agent, or Firm* — Law Office of R. Alan Burnett, P.S.

(57) ABSTRACT

Techniques for detection and handling of virtual appliance failures. In one aspect, a method is implemented on a host platform on which a hypervisor (aka Virtual Machine Manager) and a plurality of virtual machines (VMs) are running, the plurality of VMs collectively hosting a plurality of Software Defined Networking (SDN) and/or Network Function Virtualization (NFV) appliances that are communicatively coupled via a virtual network. A software-based entity running on the host platform is configured to monitor the plurality of virtual network appliances to detect failures of the virtual network appliances. In response to detection of a virtual network appliance failure, messages containing configuration information are implemented to reconfigure packet flows to bypass the virtual network appliance that has failed.

26 Claims, 7 Drawing Sheets

DETECTION AND HANDLING OF VIRTUAL NETWORK APPLIANCE FAILURES

FIELD OF THE INVENTION

The field of invention relates generally to computer networking and, more specifically but not exclusively relates to techniques for detection and handling of virtual network appliance failures associated with Software Defined Networking (SDN) and Network Function Virtualization (NFV).

BACKGROUND INFORMATION

Access to computer networks has become a ubiquitous part of today's computer usage. Whether accessing a Local Area Network (LAN) in an enterprise environment to access shared network resources, or accessing the Internet via the LAN or other access point, it seems users are always logged on to at least one service that is accessed via a computer network. Moreover, the rapid expansion of cloud-based services has lead to even further usage of computer networks, and these services are forecast to become ever-more prevalent.

Networking is facilitated by various types of equipment including routers, switches, bridges, gateways, and access points. Large network infrastructure typically includes use of telecommunication-class network elements, including switches and routers made by companies such as Cisco Systems, Juniper Networks, Alcatel Lucent, IBM, and Hewlett-Packard. Such telecom switches are very sophisticated, operating at very-high bandwidths and providing advanced routing functionality as well as supporting different Quality of Service (QoS) levels. Private networks, such as Local area networks (LANs), are most commonly used by businesses and home users. It is also common for many business networks to employ hardware- and/or software-based firewalls and the like.

In recent years, virtualization of computer systems has seen rapid growth, particularly in server deployments and data centers. Under a conventional approach, a server runs a single instance of an operating system directly on physical hardware resources, such as the CPU, RAM, storage devices (e.g., hard disk), network controllers, I/O ports, etc. Under a virtualized approach, the physical hardware resources are employed to support corresponding instances of virtual resources, such that multiple Virtual Machines (VMs) may run on the server's physical hardware resources, wherein each virtual machine includes its own CPU allocation, memory allocation, storage devices, network controllers, I/O ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

Deployment of Software Defined Networking (SDN) and Network Function Virtualization (NFV) has also seen rapid growth in the past few years. Under SDN, the system that makes decisions about where traffic is sent (the control plane) is decoupled for the underlying system that forwards traffic to the selected destination (the data plane). SDN concepts may be employed to facilitate network virtualization, enabling service providers to manage various aspects of their network services via software applications and APIs (Application Program Interfaces). Under NFV, by virtualizing network functions as software applications, network service providers can gain flexibility in network configuration, enabling significant benefits including optimization of available bandwidth, cost savings, and faster time to market for new services.

While the combination of server virtualization and network virtualization has the potential for significant advantages over conventional networking approaches, the enhanced flexibility comes at a cost. In particular, virtualization increases network management complexities, since (among other things) now the management facilities not only have to address real hardware entities, but virtual entities, as well.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for detection and handling of virtual network appliance failures associated with Software Defined Networking (SDN) and/or Network Function Virtualization (NFV) are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Service providers often desire, and in many cases mandate, that vendors supplying them with network appliance equipment (such as a firewall) have implemented a failure handling feature to deal with the catastrophic failure of the appliance. In the case of firewall appliances, the two failure handling modes that are usually identified are the "fail-to-wire" mode, meaning a pass-through mode where all packets are simply forwarded on the wire, and the "fail-to-block" mode meaning, that all packets are dropped.

Under the conventional approach, the firewall function for data centers and enterprises is implemented via a hardware appliance, with the firewall logic implemented in a combination of software and hardware (typically). These hardware appliances (and/or other network equipment provided by the vendor) are designed to both detect failure modes and reconfigure applicable network equipment in response to such detected failures.

There is a transformation in the networking space to deploy networking appliances as applications on virtual machines. These virtual machines may exist in a traditional network or in an environment implementing Software Defined Networking (SDN) and/or Network Function Virtualization (NFV). As used herein, the terms "virtual appliance," "virtualized appliance," "virtual network appliance," "network appliance," or simply "appliance" may be used interchangeably. In addition, for the purpose herein, including the claims, any software-based appliance relating to Software Defined Network or configured to implement Network Function Virtualization may more generally be referred to as a "virtual network appliance," with the understanding that virtual network appliances include any network appliance or virtualized entity that is configured to implement Network Function Virtualization and/or operations relating to Software Defined Networking Accordingly, the terms virtual network appliance or SDN appliance in the following description includes all NFV appliances, as well.

Figure 1:
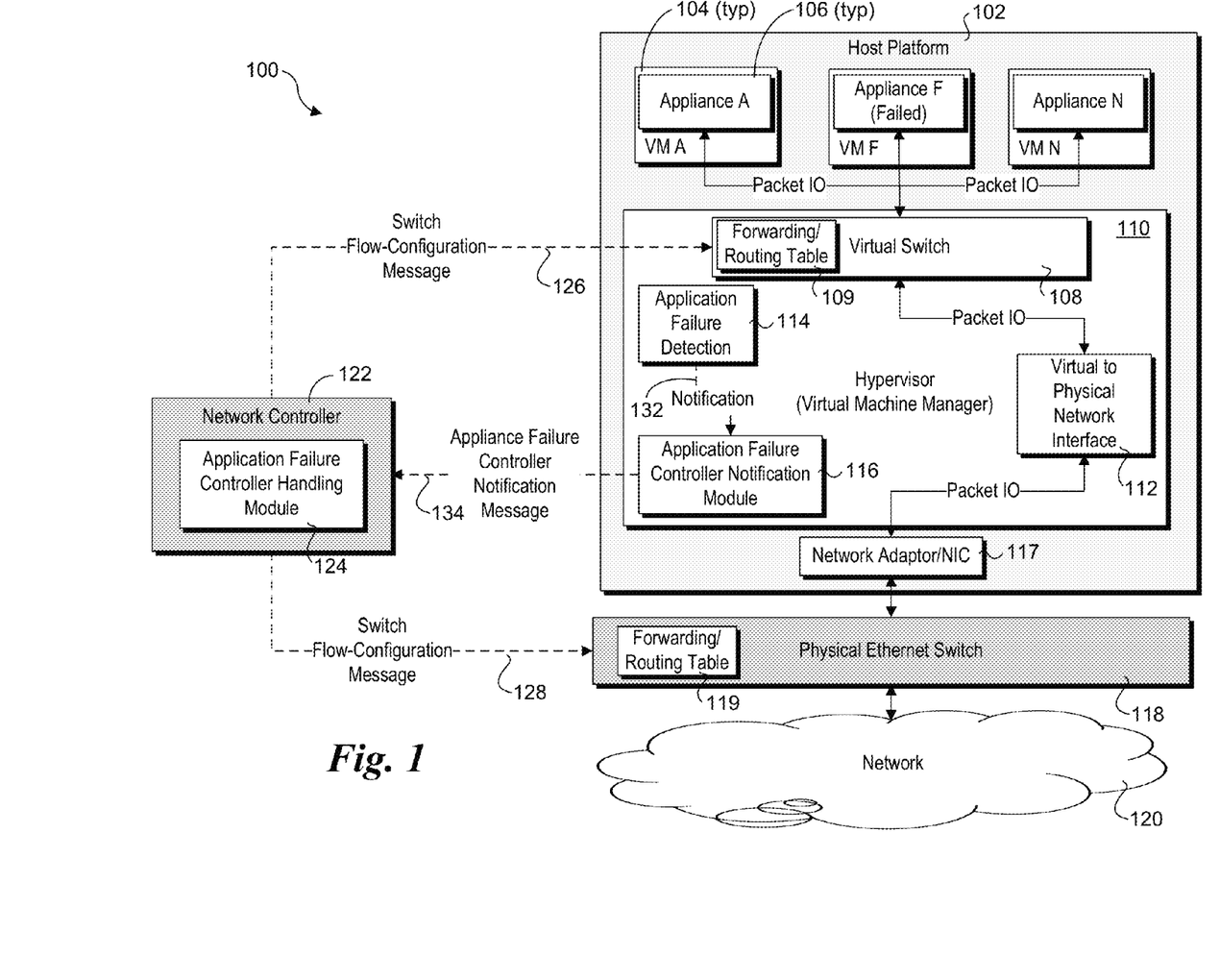
FIG. 1 is a schematic diagram of a system architecture including software components for implementing detection and handling of virtual network appliance failures, according to one embodiment.

An exemplary system architecture 100 that is configured to facilitate aspects of the embodiments is shown in FIG. 1. System architecture 100 includes a host platform 102 having physical resources that are shared among virtual entities implemented by one or more virtual machines and virtual appliances. Note that in addition to running virtual appliances, VMs may be used for running end-user applications (e.g., Web server). The virtual entities include a plurality of virtual machines 104 ("typ" means typical), each hosting a respective appliances 106, also depicted and referred to herein by labels, e.g., VM A, VM F, VM N, Appliance A, Appliance F, and Appliance N. Appliances 106 are coupled in communication with a virtual switch 108 that is associated with a hypervisor 110 (aka Virtual Machine Monitor). Also depicted as associated with hypervisor 110 is a virtual-to-physical network interface 112, application failure detection module 114, and an application failure controller notification module 116. Host platform 102 includes a network adaptor or Network Interface Controller (NIC) 117 that facilitates communication between virtual-to-physical network interface 112 and a physical Ethernet switch 118, which in turn is coupled to a network 120. System architecture 100 also includes a network controller 122 including an application failure controller handling module 124.

Generally, network controller 122 (also called an SDN controller) is responsible for the entire path of the flow. In some instances, the SDN controller only configures the virtual switches, relying on other mechanisms to configure the physical path. The SDN controller may operate in a pre-configured environment, where flows paths are established when the VM is created, or may be reactive, only setting up the flow table entries when the first packet in the flow is detected.

In the embodiment illustrated in FIG. 1, during ongoing operations network controller 122 issues switch flow control messages 126 and 128 to virtual switch 108 and physical Ethernet switch 118. The switch flow control messages contain flow configuration information that is used by each of virtual switch 108 and physical Ethernet switch 118 in managing/handling various packet flows and routing/forwarding corresponding packets by updating table entries in a forwarding/routing table 109 (for virtual switch 108) and a forwarding/routing table 119 (for physical Ethernet switch 118). Also during ongoing operations, virtual appliance failure detection operations are performed using application failure detection module 114. In response to a detection of an application failure, a failure notification 132 is sent from application failure detection module 114 to appliance failure controller notification module 116. In turn, appliance failure controller notification module 116 sends an appliance failure controller notification message 134 to network controller 122, where it is received and processed by appliance failure controller handling module 124. In response to receiving an appliance failure controller notification message, appliance failure controller handling module 124 determines a change in configuration to be effected, with configuration changes effected through use of switch flow configuration messages 126 and 128, as required (e.g., a physical switch may not need to be reconfigured).

Figure 2A:
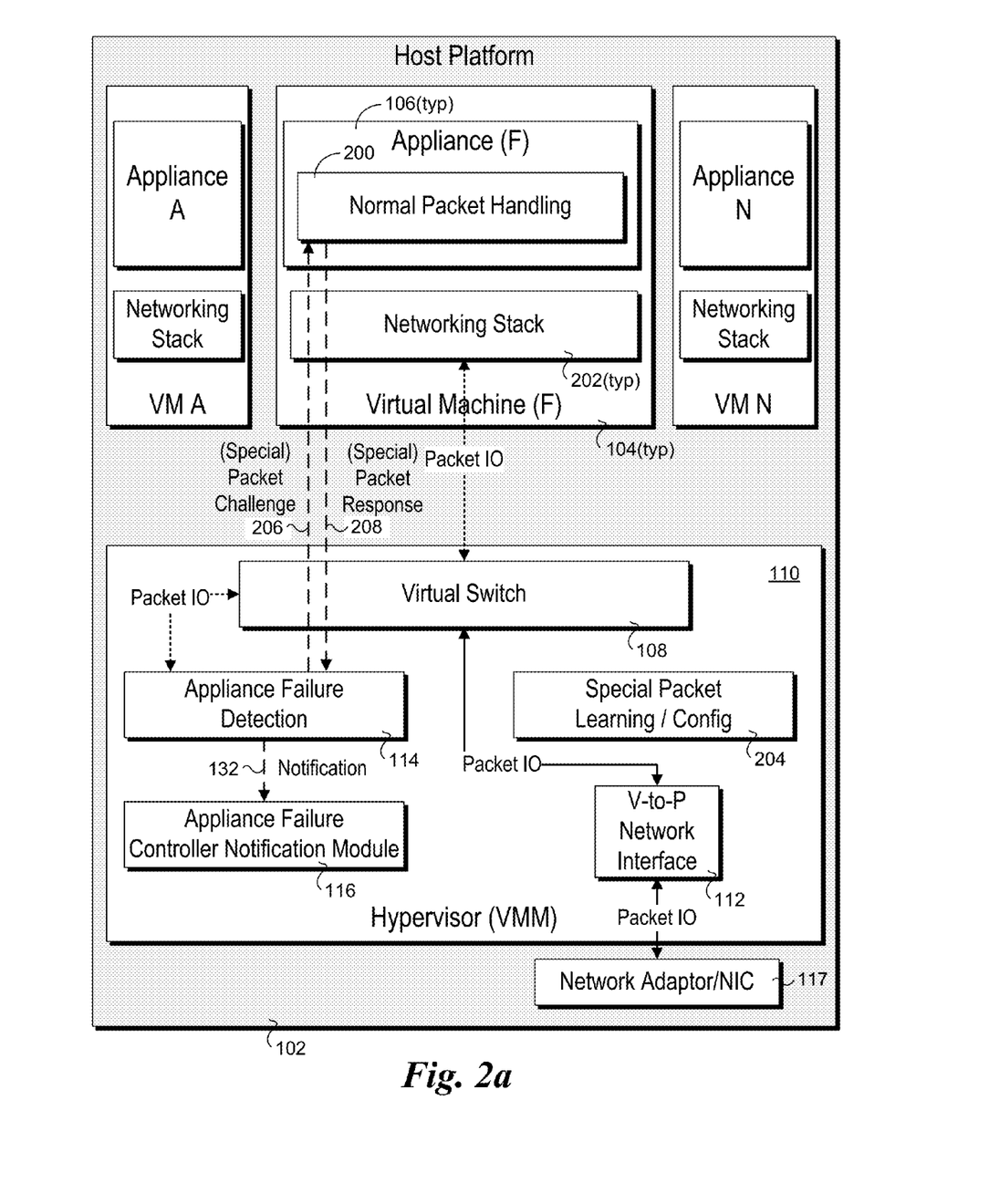
FIG. 2a is a schematic diagram illustrating further details of the hypervisor, virtual machines, and virtual network appliances of FIG. 1.

Further details of components and entities on host platform 102 for facilitating the foregoing operations are shown in FIG. 2a. As illustrated, each VM 104 hosts an appliance 106 that includes a normal packet handling block 200. Each VM further includes a networking stack 202. In addition to virtual switch 108, appliance failure detection module 114, appliance failure controller notification module 116 and network interface 112, hypervisor 110 is further depicted as including a "special" packet learning/configuration block 204.

In one instantiation, during ongoing operations appliance failure detection module 114 issues a challenge message that is sent as a packet challenge 206 to normal packet handling block 200 in appliance 206. (For illustrative purposes, direct message paths are depicted in FIG. 2a; the actual forwarding paths of the messages are through virtual switch 108 and networking stack 202.) The challenge message contains a challenge to logic within appliance 106 (depicted as being contained in normal packet handling block 200 for illustrative purposes). This appliance logic is configured to respond to the challenge with a known response, which is returned to appliance failure detection module 114 in a packet response 208. In one embodiment, if a response is not received within a configurable time period, a failure notification 132 is sent from appliance failure detection module 114 to appliance failure controller notification module 116.

Under a virtualized processing environment, a given virtual machine will run an operation system (OS) instance including a user space or the like in which one or more applications (generally multiple applications) are run. In the embodiments illustrated herein, these applications include appliances 106, which are illustrative of various types of virtual network appliances. Each VM will include an instance of a networking stack (e.g., networking stack 202), which is typically implemented as part of the OS kernel, but may also be implemented at another layer in the OS.

Under conventional approaches, a simple ping, such as a stay-alive ping, might be employed to determine if an appliance is operational. However, since pings are handled by an ICMP echo function built into the networking stack, the use of pings only serves to indicate that the networking stack itself is operational. As a result, the use of pings may not be sufficient to determine whether an application used for implementing a virtual network appliance has failed. For example, if a virtual network appliance application is "hung" or otherwise crashes, the networking stack may still be operational, and thus will return ICMP echoes in response to pings as if nothing is wrong.

Under the foregoing challenge/response scheme, the challenge/response pair is exchanged with logic within or otherwise logically associated with the appliance itself, rather than the underlying networking stack in the VM. Since the actual appliance (application) itself is being challenged directly, verification of an operational status of the appliance can be verified.

Under some embodiments, challenge and responses may be sent to and received from appliance applications without modification to packet handling logic. In these instances, challenge packet 206 and packet response 208 represent "normal" packets. However, in other embodiments, the appliance application is augmented to implement the challenge/response scheme. Under these embodiments, "special" packet challenges 206 and packet responses 208 are used. These special packets are configured such that they will comprise a type of data normally passed through the appliance and handled in a known fashion. For example, firewall appliances are configured to pass through packets that meet applicable firewall rules. Under respective embodiments, the special challenge packets may be determined by a) pre-configuration from a management entity; or b) learning through monitoring nominal packet flows, such as through use of capture/replay, which may implemented by special packet learning/configuration block 204. In addition, the special packet challenge/response may be configured in a different manner for each instance of an appliance.

In another example, the network appliance is a WAN (Wide Area Network) acceleration device. In one embodiment, a known packet is compressed in a deterministic manner, and employed for in the special packet challenge/response.

In addition to the configuration illustrated in FIGS. 1 and 2, application failure detection module 114 may be implemented in a virtual switch 108 itself. It is also noted that under different hypervisor architectures, entities and components depicted within the hypervisor blocks in the Figures herein, may be considered as separate components. For example, either or both of a virtual switch and network interface may comprise components that are considered as separate from a hypervisor.

Figure 3:
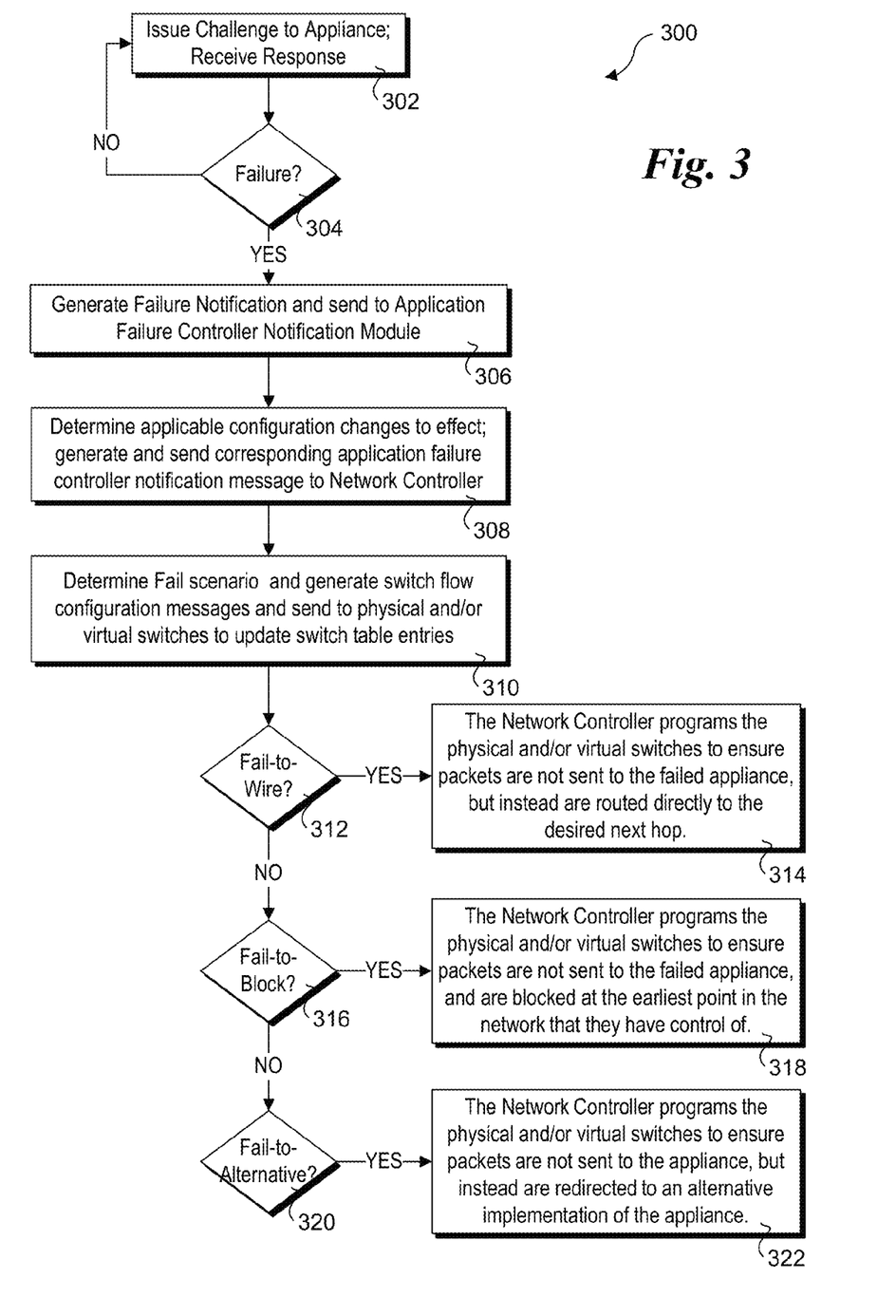
FIG. 3 is a flowchart illustrating operation and logic for handling virtual network appliance failures, according to one embodiment.

FIG. 3 is a flowchart 300 illustrating operations and logic implemented via various entities and components in system architecture 100 for detecting appliance failure scenarios and reconfiguring packet flows in response to the detected failure scenarios. As shown by a block 302 and a decision block 304, a challenge/response is performed in the manner described above on an ongoing basis in a loop-wise fashion. For example, under the configuration shown in FIG. 2a, application failure detection module 114 issues challenges to each of the applicable appliances in the VMs running on host platform 102 (e.g., Appliances A, F, and N) on a configurable periodic basis. Each of Appliances A, F, and N return responses indicating their operating state. As discussed above, if a response packet is not returned in response to a challenge, the Appliance is presumed to have failed or is otherwise not operating correctly.

In response to detection that an appliance has failed, the flowchart logic proceeds to a block 306 in which application failure detection module 114 notifies appliance failure controller notification module 116 of the failure via a failure notification message 132. As used herein, the term module includes any software-based entity that may include one or more of modules, functions, methods, applications, etc. In addition, a module may be configured to store data, such as parameters or the like. Accordingly, appliance failure controller notification module 116 may be implemented a module, a set of functions or methods, an application, or any other form of software entity that is configured to perform the operations of appliance failure controller notification module 116 herein.

Appliance failure controller notification module 116 includes configuration data and logic to implement appropriate reconfiguration of networking flow paths in response to appliance failures. Accordingly, in response to receiving a failure notification message 132, the appliance failure controller notification module will determine the applicable configuration changes that need to be effected, and send a corresponding application failure controller notification message 134 to network controller 122, as depicted in a block 308. This message will contain information identifying the appliance that has failed and the post-failure condition state for packets that should target the appliance, i.e. fail-to-wire, fail-to-block, or one or more alternative post-failure condition states. For example, an alternative post-failure condition state may indicate alternatives to the fail-to-block and fail-to-wire states such as a fail-to-alternative mode where packets can be autonomously routed to a similar appliance, e.g. a second firewall appliance that could be instantiated on the same physical platform or another platform in the network.

Next, in a block 310, application failure controller handling module 124 determines the failure scenario and generates applicable switch flow configuration messages and sends the messages to the virtual switch 108 and/or physical Ethernet switch 118. In one embodiment, application failure controller handling module 124 is configured to enable network controller 122 to program/update switch table entries in forwarding/routing tables 109 and 119 or other table entries (not shown) that are accessed by virtual switch 108 and physical Ethernet switch 118 to ensure packets/flows are directed as appropriate in view of the failed appliance and scenario.

Figure 2B:
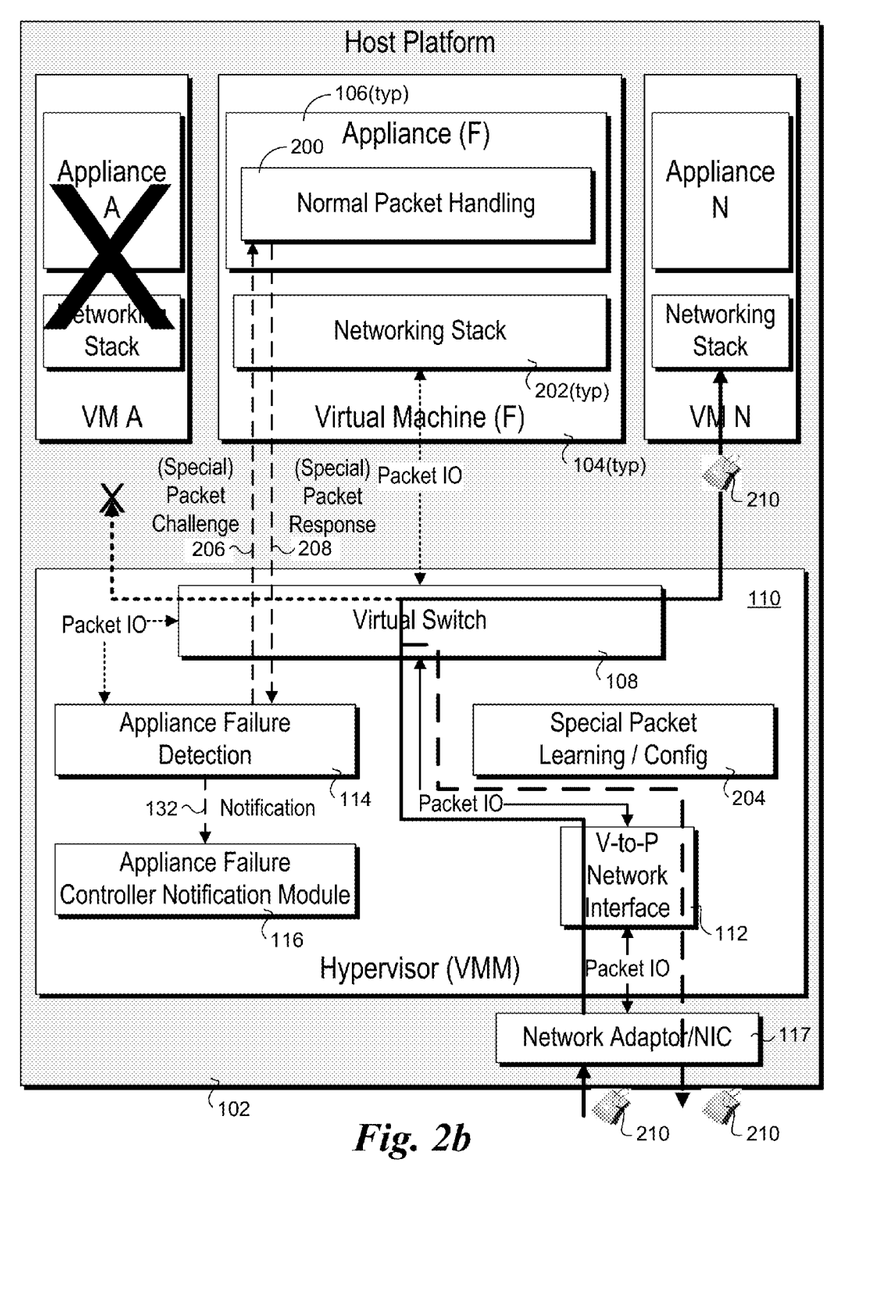
FIG. 2b is a schematic diagram illustrating a packet being forwarded to a next hop upon detection that an appliance to which the packet would normally be forwarded has failed.

As depicted by a decision block 312 and a block 314, under one embodiment of a fail-to-wire scenario, network controller 122 (via application failure controller handling module 124) is configured to program virtual switch 108 and/or physical Ethernet switch 118 to ensure packets are not sent to the failed appliance, but are instead routed directly to the desired next hop, which may be another appliance on another VM on the same platform, or may be on a separate platform coupled the host platform via a network. For example, FIG. 2b illustrates a scenario under which an inbound (from a network) packet 210 is received at network adaptor 117 and is to be forwarded to Appliance A. However, it is detected that Appliance A has failed, and thus packet 210 is forwarded to the next hop, which is depicted (in solid line) as Appliance N, which is another appliance on the same platform, or, alternatively packet 210 is sent back to the network to be forwarded to another platform (as depicted in dashed line).

Figure 2C:
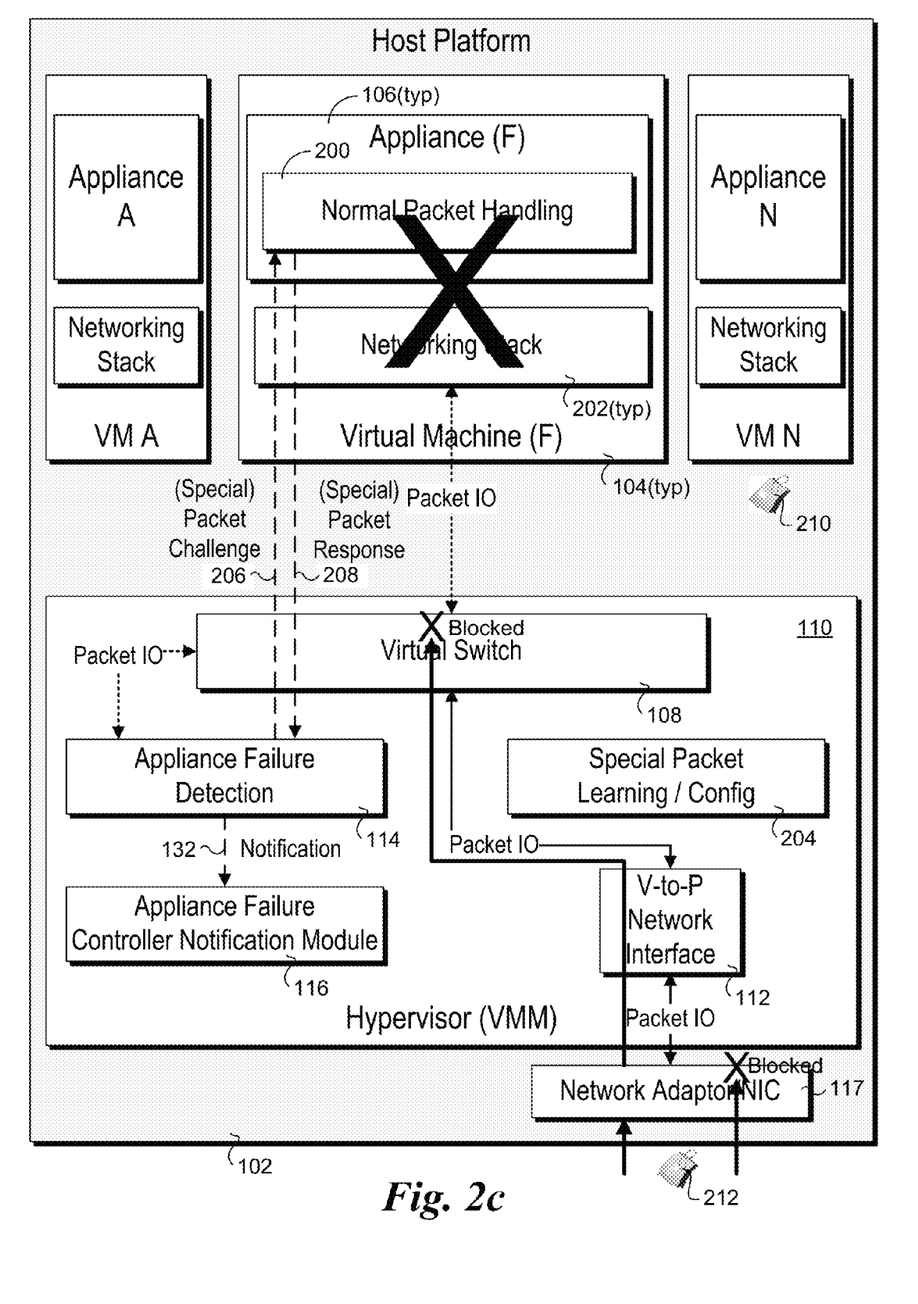
FIG. 2c is a schematic diagram illustrating a packet being forwarded to a next hop upon detection that an appliance to which the packet would normally be forwarded has failed.

As depicted by a decision block 316 and a block 318, under one embodiment of a fail-to-block scenario, network controller 122 is configured to program virtual switch 108 and/or physical Ethernet switch 118 to ensure packets are not sent to the failed appliance, and are blocked at the earliest point in the network that they have control of. Under applicable conditions, this may lead to significant savings of valuable network resources and improve the resiliency of the network. This is depicted in FIG. 2c by an inbound packet 212 normally destined for failed Appliance F being blocked at network adaptor 117 or at virtual switch 108.

Figure 2D:
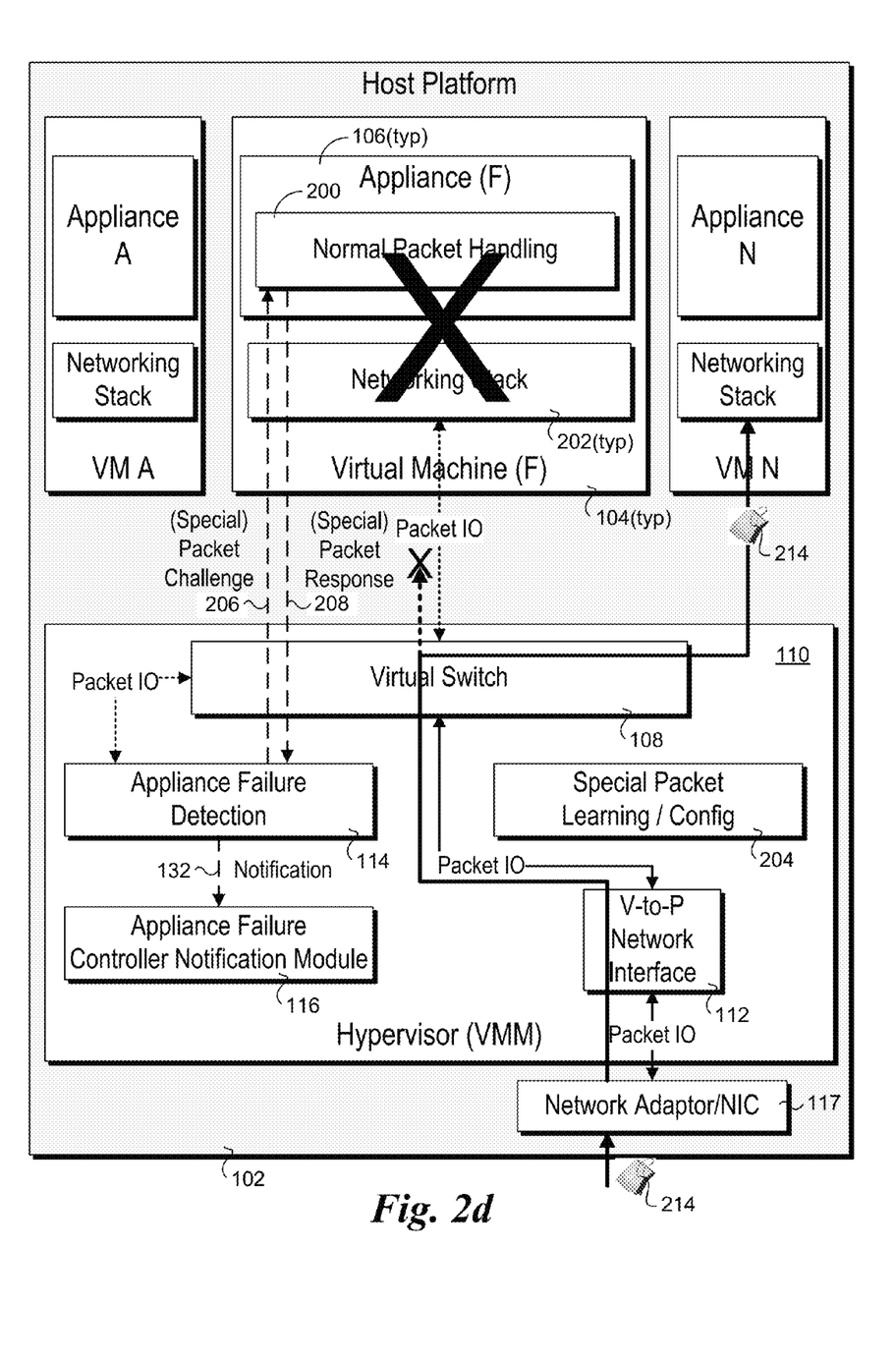
FIG. 2d is a schematic diagram illustrating a packet being forwarded to an alternative implementation of an appliance upon detection that an appliance to which the packet would normally be forwarded has failed.

In addition to the conventional fail-to-wire and fail-to-block failure scenarios, embodiments may be configured to support various fail-to-alternative failure scenarios. For example, as depicted by a decision block 320 and a block 322, under one embodiment of a fail-to-alternative scenario, network controller 122 is configured to program virtual switch 108 and/or physical Ethernet switch 118 to ensure packets are not sent to the appliance, but instead are redirected to an alternative implementation of the appliance. For example, FIG. 2d illustrates a condition under which an inbound packet 214 received at network adapter 117 normally would be forwarded to Appliance F, which is configured to implement one or more functions relating to handling the packet. However, it is detected that Appliance F has failed, and so packet 210 is forwarded to Appliance N instead, which is an alternative implementation of Appliance F and, accordingly, is configured to perform the same virtual appliance functions as Appliance F.

Figure 4:
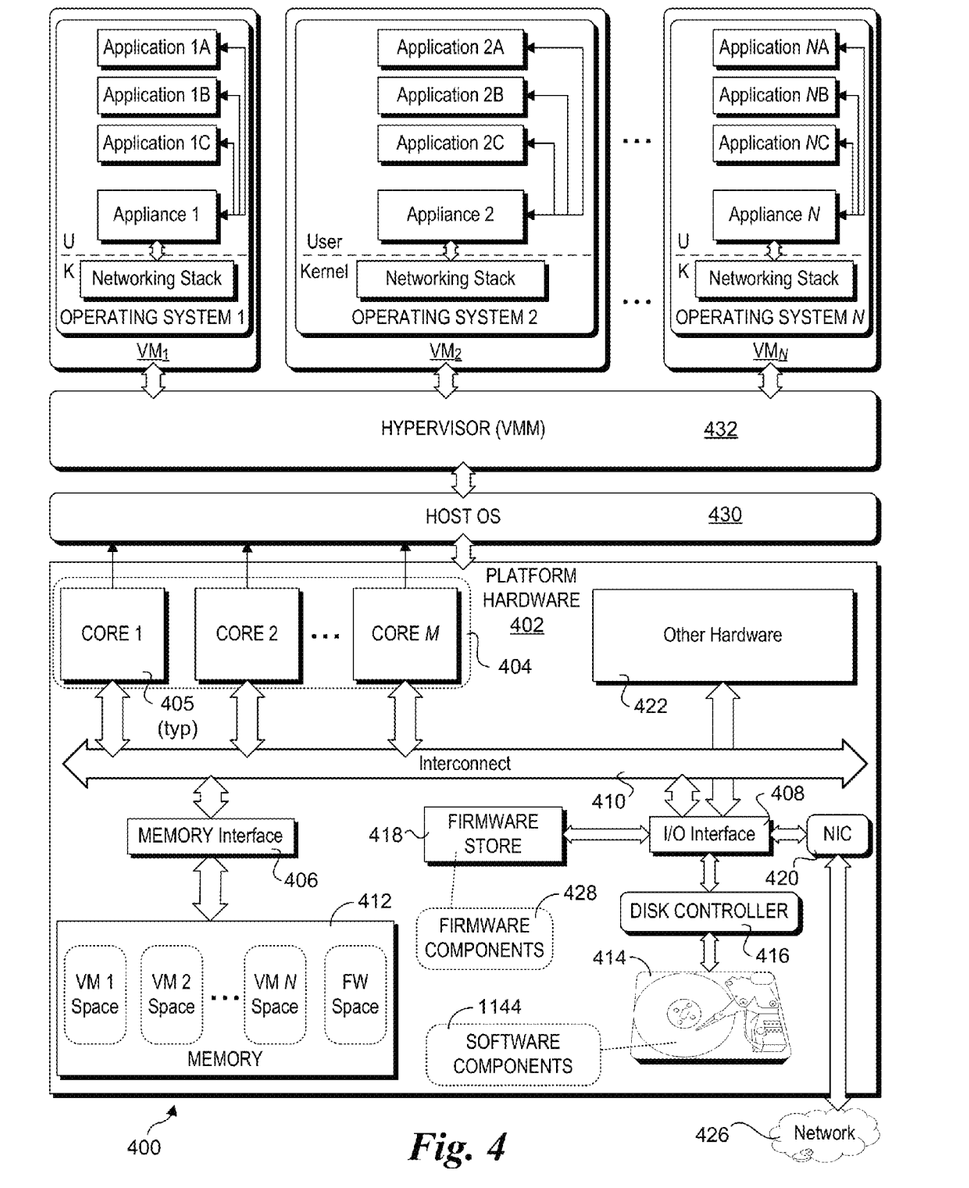
FIG. 4 is a schematic diagram of an exemplary host platform hardware and software architecture via which aspects of the embodiments disclosed herein may be implemented.

FIG. 4 shows an exemplary host platform configuration 400 including platform hardware 402 and various software-based components. Platform hardware 402 includes a central processing unit (CPU) 404 coupled to a memory interface 406 and an input/output (I/O) interface 408 via an interconnect 410. In some embodiments, all or a portion of the foregoing components may be integrated on a System on a Chip (SoC). Memory interface 406 is configured to facilitate access to system memory 412, which will usually be separate from the SoC.

I/O interface 408 is illustrative of various I/O interfaces provided by platform hardware 402. As discussed above, I/O interface 408 may be implemented as a discrete component (such as an ICH or the like), or it may be implemented on an SoC. Moreover, I/O interface 408 may also be implemented as an I/O hierarchy, such as a Peripheral Component Interconnect Express (PCIe™) I/O hierarchy. I/O interface 408 further facilitates communication between various I/O resources and devices and other platform components, such as cores 405. These include a non-volatile storage device, such as a disk drive 414 that is communicatively coupled to I/O interface 408 via a disk controller 416, a firmware store 418, a NIC 420, and various other I/O devices, collectively depicted as other hardware 422.

In general, CPU 404 may comprise a single core processor or a multi-core processor, such as depicted by M cores 405. The multiple cores are employed to execute various software components 424, such as modules and applications, that are stored in one or more non-volatile storage devices, as depicted by disk drive 414. More generally, disk drive 414 is representative of various types of non-volatile storage devices, including both magnetic- and optical-based storage devices, as well as solid-state storage devices, such as solid state drives (SSDs) or Flash memory. Optionally, all or a portion of software components 424 may be stored on one or more storage devices (not shown) that are accessed via a network 426.

During boot up or run-time operations, various software components 424 and firmware components 428 are loaded into system memory 412 (as depicted by FW space) and executed on cores 405 as processes comprising execution threads or the like. Depending on the particular processor or SoC architecture, a given "physical" core may be implemented as one or more logical cores, with processes being allocated to the various logical cores. For example, under the Intel® Hyperthreading™ architecture, each physical core is implemented as two logical cores.

Under a typical system boot for platform hardware 402, firmware 428 will be loaded and configured in system memory 1012, followed by booting a host OS 430. Subsequently, a hypervisor 432, which may generally comprise an application running on host OS 430, will be launched. Hypervisor 432 may then be employed to launch various virtual machines, $VM_{1-N}$, each of which will be configured to use various portions (i.e., address spaces) of system memory 1012. In turn, each virtual machine $VM_{1-N}$ may be employed to host a respective operating system $434_{1-N}$.

During run-time operations, hypervisor 432 enables reconfiguration of various system resources, such as system memory 412, cores 405, and disk drive(s) 414. Generally, the virtual machines provide abstractions (in combination with hypervisor 432) between their hosted operating system and the underlying platform hardware 402, enabling the hardware resources to be shared among $VM_{1-N}$. From the viewpoint of each hosted operating system, that operating system "owns" the entire platform, and is unaware of the existence of other operating systems running on virtual machines. In reality, each operating system merely has access to only the resources and/or resource portions allocated to it by hypervisor 432.

As further illustrated in FIG. 4, each operating system includes a kernel space and a user space, both of which are implemented as memory spaces in system memory 412. The kernel space is protected and used to run operating system kernel components, including a networking stack. Meanwhile, an operating system's user space is used to run user applications, as depicted by Appliances 1, 2, and 3, and Applications 1A-C, 2A-C, and NA-C.

Generally, Appliances 1, 2, and 3 are illustrative of various SDN or NFV appliances that may run on virtual machines on platform hardware 402. For simplicity, each $VM_{1-N}$ is depicted as hosting a similar set of software applications; however, this is merely for illustrative purposes, as the VMs for a given platform may host similar applications, or may host different applications. Similarly, each $VM_{1-N}$ may host a single virtual network appliance (as shown), may host multiple virtual network appliances, or may not host any virtual network appliances.

The embodiments described herein provided enhanced functionality and flexibility when compared to conventional architectures and components. For example, one advantage is that the appliance failure techniques are implemented within the host platform, without the need for relying on the use of or connectivity to components that are outside the system. This allows for faster response times to failures, and less likelihood of a false alarm. For example if an external manager was responsible for sending the challenge, a failure in the path between the external manager and the platform to be tested could result in a failure being detected, even if there was no problem in the platform.

The embodiments also provide improvements in response to both conventional physical network appliance failure conditions, and alternative failure scenarios. This permits the use of virtual network appliances in place of physical network appliances while preserving the same or similar functionality, or even enhancing functionality. For example, since virtual network appliances are entirely defined via software, they may be configured to provide additional functionality just by updating the application software. Moreover, since the connections to virtual network appliances are virtual rather than physical, packet flows through virtual network appliances may be rerouted on the fly in response to detected failures or simply to provide additional packet-handling functions. For example, separate virtual network appliances that perform a firewall function and deep packet inspection can be combined through either a software application upgrade or connection the two virtual network appliances together via a virtual connection.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact, or may apply to software interfaces and the like. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or firmware executed by an embedded processor on a network element such as a network controller. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, implemented on a host platform on which a plurality of virtual machines (VMs) are running, the plurality of VMs collectively hosting a plurality of virtual network appliances that are communicatively coupled via a virtual network, the virtual network including a virtual switch that is implemented via software running on the host platform and the host platform is communicatively coupled to a physical switch, the method comprising:
    employing a software-based entity running on the host platform to monitor the plurality of virtual network appliances to detect failures of the virtual network appliances;
    in response to detection of a virtual network appliance failure, causing packet flows to be reconfigured to bypass the virtual network appliance that has failed by, transmitting an appliance failure notification message including data identifying at least one of an identity of the virtual network appliance that has failed, a failure condition, and network reconfiguration parameters to a network controller external to the host platform; and
    generating at least one switch flow configuration message and sending the at least one switch flow configuration message to at least one of the virtual switch and the physical switch.

2. The method of claim 1, wherein monitoring the plurality of virtual network appliances to detect failures comprises:
    transmitting challenges from the software-based entity to a virtual network appliance;
    receiving responses to the challenges from the virtual network appliance;
    detecting a failure of the virtual network appliance when a response from the virtual network appliance is not received in response to a challenge transmitted to the virtual network appliance.

3. The method of claim 1, wherein the software-based entity is implemented as part of a hypervisor that is used to facilitate operation of the plurality of VMs.

4. The method of claim 1, wherein a switch flow configuration message includes at least one entry for updating:
    a forwarding table employed by a virtual switch or physical switch;

a routing table employed by a virtual switch or physical switch; or a forwarding and routing table employed by a virtual switch or physical switch.

5. The method of claim 1, further comprising:

maintaining a module in which appliance failure notification and network reconfiguration parameters are stored; and in response to one of detecting a virtual network appliance failure or receiving a notification of a virtual network appliance failure, performing a look up in the module to determine the data sent in the appliance failure notification message.

6. The method of claim 1, further comprising:

in response to detection of a virtual network appliance failure, determining the virtual network appliance failure is a fail-to-wire failure; and causing packet flows to be reconfigured to ensure packets are not sent to the virtual network appliance detected to have the failure, but instead are routed directly to a next hop.

7. The method of claim 1, further comprising:

in response to detection of a virtual network appliance failure, determining the virtual network appliance failure is a fail-to-block failure; and causing, via a virtual switch, packet flows to be reconfigured to ensure packets are not sent to the virtual network appliance detected to have failed, and are blocked at an earliest point in the virtual network that the virtual switch has control of.

8. The method of claim 1, wherein the plurality of virtual network appliances includes multiple instances of a virtual network appliance comprising alternative implementations of the virtual network appliance, the method further comprising:

in response to detection of a failure of a virtual network appliance having an alternative implementation;

determining the failure is a fail-to-alternative failure; and causing packet flows to be reconfigured to ensure packets are not sent to the virtual network appliance detected to have failed, but instead are redirected to an alternative implementation of that virtual network appliance.

9. A non-transitory machine-readable medium, having a plurality of instructions stored thereon that are configured to be executed on a processor of a host platform to cause operations to be performed comprising:

monitoring a plurality of virtual network appliances implemented via a plurality of virtual machines (VMs) running on the host platform to detect failures of the virtual network appliances; and in response to detection of a virtual network appliance failure, generating an application failure notification message including data identifying at least one of an identity of the virtual network appliance that has been detected to have failed, a failure condition, and network reconfiguration parameters and sending the application failure notification message to a network controller external to the host platform, wherein during operations of the host platform the plurality of VMs are coupled to a virtual switch and the host platform is communicatively coupled to a physical switch, and wherein the plurality of instructions further comprises an application failure controller handling module configured to be implemented on a network controller via execution of the instructions, and wherein the application failure controller handling module is configured to perform operations including, receiving the appliance failure notification; and generating at least one switch flow configuration message and sending the at least one switch flow configuration message to at least one of the virtual switch and the physical switch to effect reconfiguration of packet flows to bypass the virtual network appliance that has been detected to have failed.

10. The non-transitory machine-readable medium of claim 9, wherein a portion of the instructions comprises an appliance failure detection module that is configured to monitor the plurality of virtual network appliances to detect failures when executed by performing operations comprising:

transmitting challenges to a virtual network appliance;

receiving responses to the challenges from the virtual network appliance;

detecting a failure of the virtual network appliance when a response from a virtual network appliance is not received in response to a challenge transmitted to the virtual network appliance.

11. The non-transitory machine-readable medium of claim 10, wherein at least a portion of the plurality of instructions comprises a hypervisor, and wherein the hypervisor includes the appliance failure detection module.

12. The non-transitory machine-readable medium of claim 9, wherein a switch flow configuration message includes at least one entry for updating:

a forwarding table employed by a virtual switch or physical switch;

a routing table employed by a virtual switch or physical switch; or a forwarding and routing table employed by a virtual switch or physical switch.

13. The non-transitory machine-readable medium of claim 12, wherein execution of the instructions on the host platform and network controller perform further operations comprising:

in response to detection of a virtual network appliance failure, determining the virtual network appliance failure is a fail-to-wire failure; and updating entries in at least one of the forwarding and/or routing tables employed by the virtual switch or physical switch to cause packet flows to be reconfigured to ensure packets are not sent to the virtual network appliance detected to have the failure, but instead are routed directly to a next hop.

14. The non-transitory machine-readable medium of claim 12, wherein execution of the instructions on the host platform and network controller perform further operations comprising:

in response to detection of a virtual network appliance failure, determining the virtual network appliance failure is a fail-to-block failure; and updating entries in at least one of the forwarding and routing tables employed by the virtual switch or physical switch to cause packet flows to be reconfigured to ensure packets are not sent to the virtual network appliance detected to have the failure, and are blocked at the earliest point in the virtual network that the virtual switch or physical switch have control of.

15. The non-transitory machine-readable medium of claim 12, wherein the plurality of virtual network appliances includes multiple instances of a virtual network appliance comprising alternative implementations of the virtual network appliance, and wherein execution of the instructions on the host platform and network controller perform further operations comprising:

in response to detection of a failed virtual network appliance having an alternative implementation;
determining the failure is a fail-to-alternative failure; and
updating entries in at least one of the forwarding and routing tables employed by the virtual switch or physical switch to cause packet flows to be reconfigured to ensure packets are not sent to the virtual network appliance detected to have the failure, but instead are redirected to an alternative implementation of the virtual network appliance detected to have the failure.

16. The non-transitory machine-readable medium of claim 9, further comprising a plurality of instructions configured for implementing a module in which appliance failure notification and network reconfiguration parameters are stored, and, wherein in response to one of detecting a virtual network appliance failure or receiving a notification of a virtual network appliance failure, execution of the instructions perform a look up in the module to determine the data sent in the appliance failure notification message.

17. The non-transitory machine-readable medium of claim 9, further comprising a plurality of instructions configured to implement a virtual network appliance.

18. An apparatus, comprising:
a processor, including a plurality of processor cores;
system memory, operatively coupled to the processor;
a network interface controller (NIC) or network adaptor, operatively coupled to the processor;
a storage device, having a plurality of instructions stored thereon including instructions comprising a hypervisor that are configured to be executed via one or more of the processor cores to cause operations to be performed including,
launching the hypervisor and employing the hypervisor to manage execution of a plurality of virtual machines (VMs) via the plurality of processor cores, the plurality of VMs collectively hosting a plurality of virtual network appliances that are communicatively coupled via a virtual network;
monitoring the plurality of virtual network appliances to detect failures of the virtual network appliances; and
in response to detection of a virtual network appliance failure, generating an application failure notification message including data identifying at least one of an identity of the virtual network appliance that has been detected to have failed, a failure condition, and network reconfiguration parameters and sending the application failure notification message to a network controller external to the apparatus,
wherein the data in the application failure notification message is configured to cause the network controller to effect reconfiguration of packet flows to bypass the virtual network appliance that has been detected to have failed and wherein during operations of the apparatus the plurality of VMs are coupled to a virtual switch that is implemented via execution of a portion of the instructions stored in the storage device, and wherein the virtual switch is configured to receive switch flow configuration messages from the network controller and reconfigure packet flows to bypass the virtual network appliance that has been detected to have failed based on configuration information in the switch flow configuration messages.

19. The apparatus of claim 18, wherein a portion of the instructions comprises an appliance failure detection module that is configured to monitor the plurality of virtual network appliances to detect failures when executed by performing operations comprising:
transmitting challenges to a virtual network appliance;
receiving responses to the challenges from the virtual network appliance;
detecting a failure of the virtual network appliance when a response from a virtual network appliance is not received in response to a challenge transmitted to the virtual network appliance.

20. The apparatus of claim 19, wherein at least a portion of the plurality of instructions comprising the hypervisor include instructions corresponding to the appliance failure detection module.

21. The apparatus of claim 18, wherein a switch flow configuration message includes at least one entry for updating at least one of a forwarding table or and a routing table employed by the virtual switch.

22. The apparatus of claim 21, wherein execution of the instructions on the apparatus perform further operations comprising:
in response to detection of a virtual network appliance failure,
determining the virtual network appliance failure is a fail-to-wire failure;
generating an application failure notification message including data identifying the virtual network appliance failure is a fail-to-wire failure and sending the application failure notification message to the network controller;
receiving a switch flow configuration message from the network controller;
in view of the switch flow configuration message, updating entries in the at least one of a forwarding table or and a routing table employed by the virtual switch to cause packet flows to be reconfigured to ensure packets are not sent to the virtual network appliance that is detected to have failed, but instead are routed directly to a next hop.

23. The apparatus of claim 21, wherein execution of the instructions on the apparatus perform further operations comprising:
in response to detection of a virtual network appliance failure,
determining the virtual network appliance failure is a fail-to-block failure; and
generating an application failure notification message including data identifying the virtual network appliance failure is a fail-to-block failure and sending the application failure notification message to the network controller;
receiving a switch flow configuration message from the network controller;
in view of the switch flow configuration message, updating entries in the at least one of a forwarding table or and a routing table employed by the virtual switch to cause packet flows to be reconfigured to ensure packets are not sent to the virtual network appliance that is detected to have failed, and are blocked at an earliest point in the virtual network that the virtual switch has control of.

24. The apparatus of claim 21, wherein the plurality of virtual network appliances includes multiple instances of a virtual network appliance comprising alternative implementations of the virtual network appliance, and wherein execution of the instructions on the apparatus perform further operations comprising:
in response to detection of a failure of a virtual network appliance having an alternative implementation;

determining the failure is a fail-to- alternative failure;

generating an application failure notification message including data identifying the failure is a fail-to-alternative failure and sending the application failure notification message to the network controller;

receiving a switch flow configuration message from the network controller; and in view of the switch flow configuration message, updating entries in the at least one of a forwarding table or and a routing table employed by the virtual switch to cause packet flows to be reconfigured to ensure packets are not sent to the virtual network appliance for which the failure has been detected, but instead are redirected to an alternative implementation of that virtual network appliance.

25. The apparatus of claim 18, wherein the storage device further stores a plurality of instructions configured for implementing a module in which appliance failure notification and network reconfiguration parameters are stored, and, wherein in response to one of detecting a virtual network appliance failure or receiving a notification of a virtual network appliance failure, execution of the instructions perform a look up in the module to determine the data sent in the appliance failure notification message.

26. The apparatus of claim 18, further comprising a plurality of instructions configured to implement a virtual network appliance.

* * * * *